(12) United States Patent
Zheng et al.

(10) Patent No.: US 12,189,950 B2
(45) Date of Patent: Jan. 7, 2025

(54) DYNAMIC MEMORY MANAGEMENT APPARATUS AND METHOD FOR HLS

(71) Applicants: Huazhong University Of Science And Technology, Wuhan (CN); Zhejiang Lab, Hangzhou (CN)

(72) Inventors: Long Zheng, Wuhan (CN); Qinggang Wang, Wuhan (CN); Xiaofei Liao, Wuhan (CN); Zhaozeng An, Wuhan (CN); Hai Jin, Wuhan (CN)

(73) Assignees: Huazhong University Of Science And Technology, Wuhan (CN); Zhejiang Lab, Hangzhou (CN)

( * ) Notice: Subject to any disclaimer, the term of this patent is extended or adjusted under 35 U.S.C. 154(b) by 56 days.

(21) Appl. No.: 18/145,552

(22) Filed: Dec. 22, 2022

(65) Prior Publication Data
US 2024/0053892 A1 Feb. 15, 2024

(30) Foreign Application Priority Data
Aug. 11, 2022 (CN) .......................... 202210964944.5

(51) Int. Cl.
*G06F 3/06* (2006.01)
(52) U.S. Cl.
CPC ............ *G06F 3/061* (2013.01); *G06F 3/0656* (2013.01); *G06F 3/0673* (2013.01)
(58) Field of Classification Search
CPC ...... G06F 3/061; G06F 3/0656; G06F 3/0673; G06F 9/5016; G06F 3/0631; G06F 3/064; G06F 3/0644; G06F 3/0652; G06F 9/5022; G06F 12/0253; G06F 12/0893
See application file for complete search history.

(56) References Cited

U.S. PATENT DOCUMENTS

| | | | | |
|---|---|---|---|---|
| 7,739,460 | B1 * | 6/2010 | Carr ..................... | G06F 12/0804 711/155 |
| 10,866,842 | B2 * | 12/2020 | Mamaghani ............ | G06F 9/546 |
| 2021/0034522 | A1 * | 2/2021 | Kunnumpurathu Sivan .............. G06F 12/0815 |
| 2021/0124500 | A1 * | 4/2021 | Salamat ................. | G06F 3/0638 |
| 2023/0145760 | A1 * | 5/2023 | Cheon ....................... | G06F 7/38 708/200 |

FOREIGN PATENT DOCUMENTS

KR    20230089927 A    *    6/2023    ............. G06N 20/10

* cited by examiner

*Primary Examiner* — Charles Rones
*Assistant Examiner* — Alexander Vinnitsky
(74) *Attorney, Agent, or Firm* — Smart & Biggar LP

(57) ABSTRACT

The present invention relates to a dynamic memory management apparatus and method for HLS, the apparatus has several searching and caching modules and several modifying and writing-back modules, the searching and caching modules are in connection with a DRAM storing module and a BRAM buffer, respectively, and the modifying and writing-back modules are in connection with the DRAM storing module and the BRAM buffer, respectively, the BRAM buffer is for caching information about nodes on a search path and registering information about modification made to the nodes. To remedy the defect that the traditional operating system is directly transplanted to the FPGA and has low execution efficiency, the present invention utilizes the advantage of the large capacity of the DRAM on the FPGA to realize efficient dynamic memory allocation and deallocation, and improve the usability and code reusability of HLS.

19 Claims, 3 Drawing Sheets

| total number of memory blocks of effective space:1 | linked list index of nodes of a free tree:1 | 30, 2 | | free memory block array |
| --- | --- | --- | --- | --- |
| length of the largest memory block of the present node:2 | index of the largest memory block of the present node:0 | 7 | 3 | array of length of the largest memory block of the sub-node |
| length of the largest memory block of the sub-node:7 | index of the largest memory block of the sub-node:0 | 3b | 3c | array of pointer of the sub-node |

Fig.4

DYNAMIC MEMORY MANAGEMENT APPARATUS AND METHOD FOR HLS

BACKGROUND OF THE INVENTION

Technical Field

The present invention relates to the technical field of customized computing, and more particularly to a high-level-synthesis-oriented dynamic memory management apparatus and method thereof.

Description of Related Art

Customed hardware like FPGA is outstanding in terms of improving computing performance, providing performance several orders of magnitude over the CPU. Although FPGA has performance advantages and a mature commercial system, because FPGA applications are developed based on the RTL language expressed by hardware logic, the writing cycle is often very long. High-level synthesis (HLS) is a language proposed to accelerate FPGA development. HLS is about developing hardware by means of software languages such as C/C++ at a higher abstraction level, so that developers are freed from the complication of RTL, and programmers inexperienced in hardware development are enabled to participate in hardware development. Although HLS in many aspects performs as well as the manually programmed RTL, it does not support some common programming methods in software codes, such as dynamic memory management (malloc/free). Although these codes appear infrequently in general, they are necessary for code logic. Without mapping of these codes, developers may have to refactor the codes extensively to replace dynamic memory management with static memory management. Static memory allocation not only causes extensive code refactoring but also forces programmers to maximize memory occupancy, leading to low memory efficiency and high hardware overheads. Therefore, adding support for dynamic memory management is imperative.

Memory management is one of the most important functions of operating system, and there are many mature solutions proposed for this, such as Sequential Fits, Buddy System, Bitmapped Fits, etc. However, there is not a universal operating system for all FPGA platforms. The software method of the traditional operating system is directly transplanted to the FPGA, and the execution efficiency is not high. For example, the Buddy System method has become the most mainstream management method on the operating system due to its advantages of fast speed and simple process. However, when it is directly transplanted to the FPGA hardware platform, the memory Bandwidth limitations cause long delays.

Currently, dynamic memory management for FPGA platforms mainly includes three allocation methods based on Fixed Size, Bitmap, and Buddy System, which are all not suitable for managing of GB-scale memory space in DRAM. The Fixed Size method can only allocate memory blocks of a fixed length, resulting in poor flexibility, resulting in a large number of memory fragments and low memory utilization. According to Bitmap, every bit in the vector corresponds to one address block of fixed length, so it is possible to perform allocation and deallocation of memory by looking up the vector and reversing the corresponding number of bits. This approach, however, is not suitable for management of GB-scale DRAM because the vector can become too long in the GB-scale memory space and therefore in the worst case every round of allocation may necessitate traversing the entire vector, which means poor allocation efficiency. Buddy System uses the tree structure to accelerate bitmap looking-up but the clock frequency decreases greatly with the increase of the tree height, preventing it from being a suitable approach to management of large DRAM.

China Patent Publication No. CN109324904A publishes a dynamic memory management method and its apparatus. The method includes: S10. determining which type of memory management is currently in need; S21. if it is determined that there are data objects having to be stored into a TypedArray, further determining whether there is empty space in the TypedArray, wherein storage units having a first predetermined length have been pre-assigned in the TypedArray; and if yes, proceeding with the step S31; S31. storing the data objects into one of the storage units in a storage order according to the length of data currently in the TypedArray, and the data length is incremented by 1. The prior art method uses a TypedArray to manage JavaScript dynamic memory, and significantly reduces the frequency for the JavaScript engine to assign memory or to collect garbage, thereby improving JavaScript performance. However, the prior-art method is not suitable for management of GB-scale DRAM.

China Patent Publication No. CN103377134A publishes a dynamic memory management system on the basis of a Harvard architecture. The dynamic memory management system comprises a Harvard architecture processor, a program bus, a data bus, a program memory, a data memory, a dynamic memory management unit and a dynamic memory which is controlled by the dynamic memory management unit. The dynamic memory management system has the advantages that the dynamic memory management unit can be configured by programs in the program memory according to application requirements on the system, so that the dynamic memory can be accessed by the program bus or the data bus, program memory space and data memory space can be dynamically distributed, and the performance of the system can be improved to the greatest extent. However, the prior-art system is also not suitable for management of GB-scale DRAM.

As mentioned above, none of the published invention patents solve the defects proposed by the present invention. The present invention aims to provide a high-level-synthesis-oriented dynamic memory management apparatus and method thereof.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

Currently, dynamic memory management for FPGA platforms mainly includes three allocation methods based on Fixed Size, Bitmap, and Buddy System, which are all not suitable for managing of GB-scale memory space in DRAM. The Fixed Size method can only allocate memory blocks of a fixed length, resulting in poor flexibility, resulting in a large number of memory fragments and low memory utilization. According to Bitmap, every bit in the vector corresponds to address blocks of a fixed length, so it is possible to perform allocation and deallocation of memory by looking up the vector and reversing the corresponding number of bits. This approach, however, is not suitable for management of GB-scale DRAM because the vector can become too long in the GB-scale memory space and therefore in the worst case every round of allocation may necessitate traversing the entire vector, which means poor allocation efficiency. Buddy System uses the tree structure to accelerate bitmap looking-up but the clock frequency decreases greatly with the increase of the tree height, preventing it from being a suitable approach to management of large DRAM.

In view of the shortcomings of the prior art, the present invention provides a high-level-synthesis-oriented dynamic memory management apparatus, at least comprising: several searching and caching modules and several modifying and writing-back modules, wherein the searching and caching modules are in connection with a DRAM storing module and a block random access memory (BRAM) buffer, respectively, and the modifying and writing-back modules are in connection with the DRAM storing module and the BRAM buffer, respectively, wherein the BRAM buffer is for caching nodes on a searching path and registering information about modification to the nodes; the searching and caching module is for reading node data from the DRAM storing module according to received operators and node addresses, and writing the node data into the BRAM buffer; and the modifying and writing-back module reads the node data from the BRAM buffer and writes the node data back into the DRAM storing module. The present invention supports dynamic memory management for HLS and thereby reduce coding workload and improves memory utilization.

Preferably, the DRAM storing module is at least divided into a static storage area, a dynamic storage area, and a multi-way search tree storage area; wherein the static storage area is for storing information that will not be released once written; the dynamic storage area is a dynamically managed memory area; and the multi-way search tree storage area is for storing search tree structure information. The multi-way search tree structure manages the nodes as the granularity based on the free node linked list. When reading a node, the multi-way search tree storage area extracts the next node from the head of the free node linked list, and when releasing a node, reinserts the empty node into the head of the free node linked list. The present invention uses a search tree structure to manage free blocks and designs corresponding algorithms for memory allocation and deallocation as well as bi-directional pipeline, so that allocation and deallocation of memory blocks can both be done in memory reading and writing for the number of times as many as the tree height while avoiding backtracking traversal of the search tree.

Preferably, the plural searching and caching modules are arranged into a multi-layer structure that has the same number of layers as the search tree, wherein after one of the searching and caching modules analyzes the operators and the node data, the searching and caching module transmits the corresponding operators and the addresses of the nodes to be read to the searching and caching module in the next level.

Preferably, the plural modifying and writing-back modules are arranged into a multi-layer structure that has the same number of layers as the search tree, and the modifying and writing-back modules modify the nodes in the BRAM buffer according to the received operators, and write the node data back into the multi-way search tree storage area in the DRAM storing module, wherein after one of the modifying and writing-back modules analyzes the operators and the read nodes, the modifying and writing-back module transmits the corresponding operators to the modifying and writing-back module at next layer.

Preferably, the data transmission order among the layers of the plural searching and caching modules is reverse to the data transmission order among the layers of the plural modifying and writing-back modules.

Preferably, the multi-way search tree storage area is configured to manage memory in such a manner that: it manages free blocks in the memory based on the structure of the search tree; wherein a free block is a minimum unit of the memory and is represented by its head address and its length.

The present invention manages memory through free memory blocks and represents a free memory block using the head address and the length of the memory block, so it is capable of managing not only BRAMs up to tens of MBs but also 16 GB DRAMs. As it occupies little space in a BRAM, more resources can be saved for computing units.

Preferably, the apparatus further comprises a converting module, which is in connection with the searching and caching module at the bottom layer and the modifying and writing-back module at the bottom layer, respectively, wherein after the searching and caching module at the bottom layer transmits the operators for releasing the memory blocks to the converting module, the converting module switches the delivery order of the operators to the reverse order and delivers the operators to the modifying and writing-back module connected to it.

Preferably, the apparatus further comprises a request queue, which is in connection with the plural searching and caching modules and is for caching memory allocation requests and memory deallocation requests issued by a computing unit. the allocating requests that are failed due to out of memory are cached in the queue, and the dequeued allocating requests are added into the pipeline to participate in computing.

The present invention further provides a high-level-synthesis-oriented dynamic memory management method, at least comprising: A number of the searching and caching modules are set to a multi-layer structure in the same number as the of layers of the search tree, and a number of the modifying and writing-back modules are set to a multi-layer structure in the same number as layers of the search tree at the searching and caching modules, reading node data from a DRAM storing module according to operators and node address transmitted by the upper layer and writing the node data into a BRAM buffer that caches information about nodes on a searching path and caches information about modification made to the nodes; and at the modifying and writing-back modules, reading the node data from the BRAM buffer and writing the node data back into the DRAM storing module.

Preferably, the method further comprises: dividing the DRAM storing module into at least a static storage area, a dynamic storage area, and a multi-way search tree storage area; wherein the static storage area is for storing information that will not be freed once written, the dynamic storage area is a dynamically managed memory area; and the multi-way search tree storage area is for storing search tree structure information and is configured to manage a memory in such a manner that: it manages free memory blocks in the memory based on the structure of the search tree; wherein a free memory block is a minimum unit of the memory.

The method of the present invention uses a search tree structure to manage free memory blocks and takes corresponding algorithms for memory allocation and deallocation as well as bi-directional pipeline, so that allocation and deallocation of memory blocks can both be done in memory reading and writing for the number of times as many as the tree height while the need for performing backtracking and traversals on the search tree can be avoided, thereby significantly improving efficiency of memory management.

BRIEF DESCRIPTION OF THE DRAWINGS

FIG. 4 schematically depicts the storage structure of a preferred multi-way search tree according to the present invention.

DETAILED DESCRIPTION OF THE INVENTION

The following description is to be read with reference to the accompanying drawings.

In view that the existing solutions are not suitable for management of GB-scale DRAM and can lead to disadvantages like poor flexibility, low memory usage, long vectors depending on memory space, inferior allocation efficiency, and greatly decreased clock frequency, the present invention provides a high-level-synthesis-oriented dynamic memory management apparatus and its method, with the attempt to enable dynamic management of DRAM-scale memory.

Figure 1:
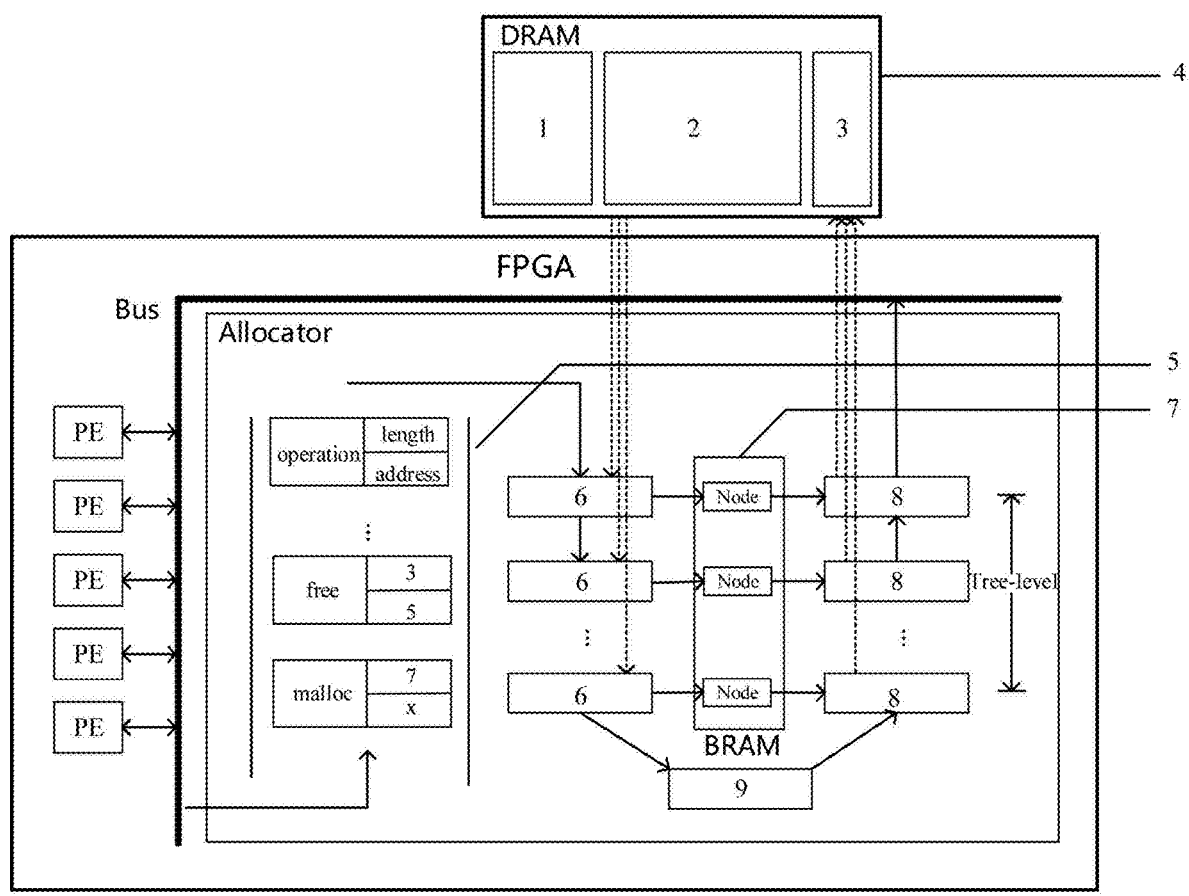
FIG. 1 schematically depicts the hardware structure of a preferred high-level-synthesis-oriented dynamic memory management apparatus according to the present invention.

According to the present invention, a high-level-synthesis-oriented dynamic memory management apparatus have a hardware structure as shown in FIG. 1.

A high-level-synthesis-oriented dynamic memory management apparatus comprises a request queuing module 5, several searching and caching modules 6, BRAM buffer 7, several modifying and writing-back modules 8 and a switching module 9.

The request queuing module 5 may be an application-specific integrated chip, CPU, a logic processing module, or the like. The request queuing module 5 is used to execute the program code of the specific steps of the request queue.

The searching and caching module 6 is a cache that performs the step for searching and caching of the present invention according to a preset program code.

The BRAM buffer 7 is a cache that performs the step for caching of the present invention according to a preset program code.

The modifying and writing-back module 8 may be an application-specific integrated chip, a processor (CPU), a logic processing module, or the like. The modifying and writing-back module 8 can execute the program code of the modifying and writing-back step.

The switching module 9 may be an application-specific integrated chip, a processor (CPU), a logic processing module, or the like. The switching module 9 can execute the program code of the switching operation of the present invention.

A request queuing module 5 is in connection with the in-port of the apparatus, and thereby receives and caches input about memory allocation and deallocation requests through the receiving port. The allocation requests that failed due to out of memory are also cached in the queue. The out-queue requests will be added into the pipeline to participate in computing. For example, a computing unit PE communicates with an allocation unit through an AXI bus to send memory allocation and deallocation request information to the receiving port and receive memory addresses and memory release results. The request queuing module 5 stores a request that applies for 3 memory units and a releasing request for memory block having a length of 3 starting from the memory unit No. 5.

The DRAM storing module 4 is a dynamic random access memory. The DRAM storing module 4 is at least divided into a static storage area 1, a dynamic storage area 2, and a multi-way search tree storage area 3. The static storage area 1 is used to stores information that will not be released once written. Specifically, the static storage area 1 is used to store information that will not be released once written, such as computing parameters. The dynamic storage area 2 is a memory area under dynamic management. The multi-way search tree storage area 3 is used to store search tree structure information. Therein, the multi-way search tree storage area 3 manages search tree structure information at a per-node granularity based on a free node linked list. For node extraction, the multi-way search tree storage area 3 extracts the next node from a head of the free node linked list, and for node release, a free node is inserted back into the head of the free node linked list.

The request queuing module 5 is in connection with the individual searching and caching modules 6, respectively. Preferably, plural searching and caching modules 6 are arranged into a multi-layer structure that has as many layers as the search tree does, as shown in FIG. 1. After the searching and caching modules 6 analyzes the operators and the node data, the searching and caching module 6 transmits the corresponding operators and the addresses of the nodes to be read to the next adjacent searching and caching module 6 according to a downwards order. As shown in FIG. 1, computing of the layer serial numbers of the searching and caching modules 6 may be performed in the direction indicated by the arrow in the drawing, namely from up to down. The operator and the node data are transmitted from the searching and caching module 6 at the upper layer to the searching and caching module 6 at the lower layer.

Every searching and caching module 6 is in connection with the BRAM buffer 7. Every searching and caching module 6 is in connection with the DRAM storing module 4. The searching and caching module 6 reads node data from the DRAM storing module 4 according to the operators and the node address received from the upper layer searching and caching module and sends them into the BRAM buffer 7. The BRAM buffer 7 is for caching node information on the search path and caching information about modification made to the nodes.

Preferably, plural modifying and writing-back modules 8 are arranged into a multi-layer structure that has as many layers as the search tree. The BRAM buffer 7 is in connection with every modifying and writing-back module 8. Every modifying and writing-back module 8 is in connection with the DRAM storing module 4.

The modifying and writing-back module 8 modifies the nodes in the BRAM buffer 7 according to the received operators, and writes the node data back into the multi-way search tree storage area 3 in the DRAM storing module 4.

The searching and caching module 6 at the bottom layer and the modifying and writing-back module 8 at the bottom layer are in connection with the switching module 9, respectively. After the searching and caching module 6 at the bottom layer transmits the operators for releasing memory blocks to the switching module 9, the switching module 9 reverses the transmission order of the operators and transmits the operators to the modifying and writing-back module 8 connected thereto.

In the present invention, as shown in FIG. 1, the search tree structure may have three layers, for example. In this case, the number of layers of the searching and caching modules 6 is 3, and the number of layers of the modifying and writing-back module 8 is 3. The layers are numbered with 1, 2, 3 from up to down in order. The searching and caching modules 6 transmit the operators and the node data across the layers in the order of 1→2→3. The modifying and writing-back modules 8 transmit the operators across the layers in the order of 3→2→1.

The modifying and writing-back modules 8 read the node data from the BRAM buffer 7 and write the data back into the DRAM storing module 4. After one of the modifying and writing-back modules 8 analyzes the operators and the read nodes, the modifying and writing-back module 8 transmits the corresponding operators to the adjacent modifying and writing-back module. Taking the transfer sequence shown in FIG. 1 as an example, if the direction of the arrow in the figure is followed, the hierarchical serial number of the modifying and writing-back module 8 is calculated and modified from top to bottom. The operator is passed from the modifying and writing-back module 8 of the lower layer to the modifying and writing-back module 8 of the upper layer.

As shown in FIG. 1, the plural searching and caching modules 6 transmit the data across the layers in an order reverse to the order by which the plural modifying and writing-back modules 8 transmit the data across the layers. The layer transmission order shown in FIG. 1 is merely an example of the present invention but not to limit implementation of the present invention.

Preferably, the multi-way search tree storage area 3 is configured to manage a memory in such a manner that it manages free blocks in the memory based on the search tree structure.

Figures 2, 3:
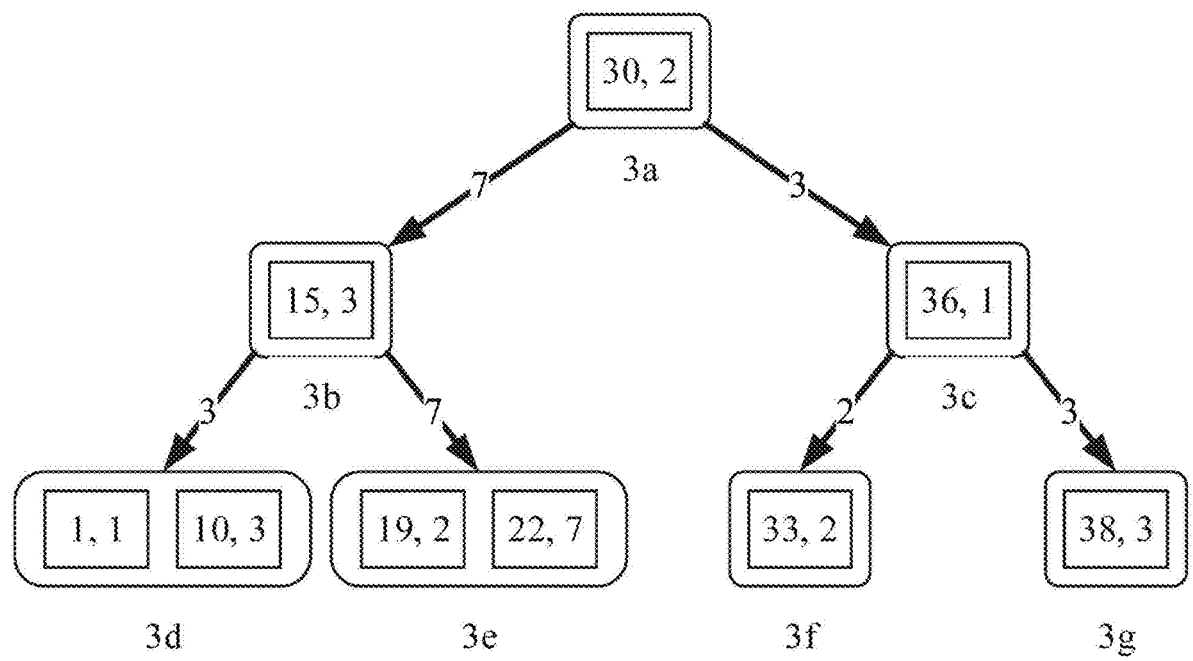
FIG. 2 schematically illustrates preferred mapping of free blocks according to the present invention.
FIG. 3 schematically depicts the logic structure of a preferred multi-way search tree according to the present invention.

A free block is the minimum unit of memory, and may be represented by the head address and the length of the free block. As shown in FIG. 2, a memory block having a head address of 22 and a block length of 7 may be represented as (22, 7). The same manner applies to other memory blocks.

As shown in FIG. 3, every tree node of the search tree stores plural free blocks. All the free blocks in the tree nodes share common upper and lower number limits. When the number of free blocks is upper than the upper limit, tree nodes are split, and when the number of free blocks is lower than the lower limit, tree nodes are merged, so that the number of free blocks in every tree node are fit to the restrictions set by the upper and lower limits.

To split a tree node, a free block is inserted into the parent node. To merge tree nodes, a free block is removed from the parent node.

The multi-way search tree is an ordered search tree. The free blocks in every tree node are arranged in order by their head addresses. All the free blocks in tree nodes have their head addresses in-order sorted. As shown in FIG. 3, free block number of the search tree has an upper limit of 2 and a lower limit of 1, and the free address blocks (1, 1) (10, 3) in the node No. 3 are arranged in order by their head addresses. Similarly, in-order sorting is applied among the nodes 3a-3g.

The data items of the multi-way search tree are configured as shown in FIG. 4 and include: the total number of valid free blocks in tree node, the free tree node linked list index, the free block array, the child-node index array, the child-node largest memory block length array, the largest memory block length of the present node, the maximum free block index of present node, sub-node largest memory block index, and the sub-node largest memory block length.

The present invention uses a search tree structure to manage free memory blocks and designs corresponding algorithms for memory allocation and deallocation as well as bi-directional pipeline, so that allocation and deallocation of memory blocks can both be done in memory reading and writing for the number of times as many as the tree height while the need for performing backtracking and traversals on the search tree can be eliminated.

In the present invention, the memory allocation operation is used to delete at least one memory block by means of bi-directional pipeline, and the memory deallocation operation is used to insert at least one memory block by means of bi-directional pipeline.

The present invention performs computing on the search tree through the bi-directional pipeline, and the specific steps are detailed below.

In the step S1, the searching and caching module 6 executes.

The searching and caching module 6 performs different kinds of searches on the search tree according to instructions, and caches data to be used in the modifying and writing-back module 8 into the BRAM buffer 7.

The execution direction of the searching and caching module 6 is from the root toward the leaves of the search tree. Data to be cached at least include: nodes, address of the node, addresses of sibling nodes, search paths, memory blocks of parent nodes, and search directions. The data need to be transmitted from the searching and caching module 6 to a searching and caching module 6 at the lower layer include: operators, addresses of released memory blocks, lengths of released memory blocks, addresses of nodes at the lower layer to be searched, addresses of sibling nodes of the nodes at the lower layer, and free blocks transmitted to nodes at the lower layer.

Specifically, the way to search and cache is as follows.

The deallocation operation of memory blocks is performed. Then search is made to the search tree in the order of the addresses, so as to find a downward search path, and determine whether a released memory block can be merged with its adjacent memory blocks in the same node. If the released memory block can be merged with the memory blocks at its two sides, the memory blocks are merged and then search is made downwards to find successor memory blocks for replacement. If the released memory block can only be merged with the memory block at its one side, downward search is made to find a successor or a predecessor. If mergence is not possible, the instruction for releasing a memory block is passed downward. If the memory block overlaps another memory block, an operation of failed releasing is sent.

The applying for memory space operation is performed. Then it is determined whether allocation can be done with the largest memory block in the node according to the largest memory block index in the node. If the largest memory block is larger than the required length, allocation is done and an operation of successful allocation is transmitted downwards. If the largest memory block in the present node is just as required, downward search is made to find a successor memory block to replace the memory block. If the largest memory block in the present node is not large enough for the required allocation, downward search is made to find another largest memory block according to child-node largest memory block index.

The same operation is passed downward according to the search direction while the operation is searching the precursor, searching the successor, searching the alternative memory block, allocation failure, deallocation failure.

The search performed on the search tree supports worst fits that means first allocating the largest memory block and first fits that means first allocating the first memory block that meets the requirement. Meanwhile, representation based on the free blocks prevent internal fragmentation, thereby improving memory utilization.

Taking deallocation of the memory block (3, 4) for example, the searching and caching module 6 first caches the node 3a, and then identifies the node 3b that is to be loaded at the lower layer according comparison of the head addresses. Meanwhile, since the memory block (3, 4) cannot be merged with the memory block (30, 2), the same search operation is transmitted to the searching and caching module 6 at the lower layer. The succeeding searching and caching module reads the nodes 3b, 3d and performs the same operation.

In the step S2, the operation switching module 9 converts the operation. In particular, the searching and caching operation with a downward order is converted into a modifying and writing-back operation with an upward order. This step does not involve any particular node or memory access.

The operation for memory block release is transmitted to the operation switching module 9 and converted into an insertion operation that is further transmitted to the upper layer.

Specifically, operations are switched through a process detailed below.

In the operation for memory release, an insertion operation is transmitted to the modifying and writing-back module 8 at the upper layer, and the released memory blocks are converted into memory blocks to be inserted into the upper layer, after which an operation for successful release is transmitted upward.

Then search is made to find the predecessor or the successor. If the parent free memory block is neither a predecessor nor a successor, an operation for successful release is transmitted upward. If the parent free memory block is a predecessor or a successor, and operation for free memory block deletion is transmitted to the upper layer.

Other operations are converted into corresponding failed operations and transmitted to the upper layer.

In the step S3, the modifying and writing-back module 8 writes back modification.

Information of modification made to the node at the lower layer is transmitted to the modifying and writing-back module 8 at the upper layer. And writing-back is performed by writing the data cached in the BRAM buffer 7 back into the DRAM. the path is the same as that used in the step S1 but the execution direction is reverse to S1.

Data to be transmitted to the modifying and writing-back module 8 at the upper layer include: operator, assigned address, address of node and sibling nodes, split node address, memory block used for merge or replacement, memory blocks inserted upward, and the largest memory block of the node and its sibling node.

Specifically, the process how the modifications are written back are detailed below.

In the operation for memory block replacement, the memory blocks transmitted upward by the sub-nodes and the memory blocks corresponding to the node are exchanged, and then the largest memory block length and address of the present node are updated.

In the operation for memory block deletion, the corresponding memory block in the node is deleted. If the number of memory blocks in the node after deletion is smaller than the lower limit, the corresponding memory block of the parent node is inserted. The sibling node transmits a memory block to the parent node, and transmits the operation for memory block replacement upward. If the sibling node does not have enough memory blocks, two nodes are merged, and the memory block of the parent node is inserted. Then the operation for memory block deletion is transmitted upward.

The operation for memory block insertion is inserting the memory block into the parent node. If the insertion will cause excess of the upper limit, the node is split and a memory block will be inserted to the parent node. Then the operation for memory block insertion is transmitted upward. If the node after insertion stays within the upper limit, an operation for completion is transmitted upward.

The replacing predecessor or successor memory block operation is performed to replace the corresponding memory block. Replace the correspond memory block, update the largest memory block and transmit the completion operation.

For example, when the insertion operation is transmitted to the node No. 3, if the insertion will cause excess of the upper limit 2 of the node, the node is split and the memory block is inserted into the parent node 3b. The same determination and operations are applied to 3b, 3a.

Through the steps described above, deallocation of the memory block (3, 4) is done. Allocation of memory is performed in the way similar to deallocation, which involves performing deletion and insertion on the search tree using the bi-directional pipeline instead. Repeated description is herein omitted.

It should be noted that the above-mentioned specific embodiments are exemplary, and those skilled in the art can come up with various solutions inspired by the disclosure of the present invention, and those solutions also fall within the disclosure scope as well as the protection scope of the present invention. It should be understood by those skilled in the art that the description of the present invention and the accompanying drawings are illustrative rather than limiting to the claims. The protection scope of the present invention is defined by the claims and their equivalents. The description of the present invention contains a number of inventive concepts, such as "preferably", "according to a preferred embodiment" or "optionally" all indicate that the corresponding paragraph discloses an independent idea, and the applicant reserves the right to file a divisional application based on each of the inventive concepts.

What is claimed is:

1. A dynamic memory management apparatus for HLS, at least comprising: several searching and caching modules and several modifying and writing-back modules,
   wherein the searching and caching modules are in connection with a DRAM storing module and a block random access memory (BRAM) buffer respectively, and the modifying and writing-back modules are in connection with the DRAM storing module and the BRAM buffer respectively, wherein the BRAM buffer is for caching information about nodes on a search path and registering information about modification made to the nodes;
   the searching and caching module is for reading node data from the DRAM storing module according to received operator and address of node, and writing the node data into the BRAM buffer; and the modifying and writing-back module reads the node data from the BRAM buffer and writes the node data back into the DRAM storing module, wherein the DRAM storing module is at least divided into a static storage area, a dynamic storage area, and a multi-way search tree storage area, the static storage area is for storing information that will not be released once written;

the dynamic storage area is a dynamically managed memory area; and the multi-way search tree storage area is for storing search tree structure information so that the search tree structure information is managed based on a free node linked list at a node-based granularity, for node extraction, the multi-way search tree storage area extracts the next node from a head of the free node linked list, and for node release, a free node is inserted back into the head of the free node linked list.

2. The dynamic memory management apparatus for HLS of claim 1, wherein the plural searching and caching modules are arranged into a multi-layer structure that has as many layers as the search tree does, wherein after one of the searching and caching modules analyzes the operators and the node data, the searching and caching module transmits the corresponding operators and the addresses of the nodes to be read to the next adjacent searching and caching module.

3. The dynamic memory management apparatus for HLS of claim 2, wherein the plural modifying and writing-back modules are arranged into a multi-layer structure that has as many layers as the search tree does, and the modifying and writing-back modules modify the nodes in the BRAM buffer according to the received operators, and write the node data back into the multi-way search tree storage area in the DRAM storing module, wherein after one of the modifying and writing-back modules analyzes the operators and the read nodes, the modifying and writing-back module transmits the corresponding operators to the adjacent modifying and writing-back module.

4. The dynamic memory management apparatus for HLS of claim 3, wherein a data transmission order among the searching and caching modules is reverse to the plural modifying and writing-back modules.

5. The dynamic memory management apparatus for HLS of claim 4, wherein the multi-way search tree storage area is configured to manage a memory in such a manner that:

it manages free memory blocks in the memory based on the structure of the search tree; wherein a free memory block is a minimum unit of the memory and is represented by its head address and length.

6. The dynamic memory management apparatus for HLS of claim 5, further comprising a switching module, which is in connection with the searching and caching module at the bottom layer and the modifying and writing-back module at the bottom layer, respectively, wherein after the searching and caching module at the bottom layer transmits the operators for releasing the memory blocks to the switching module, the switching module reverses the transmission order and transmits those to the modifying and writing-back module connected thereto.

7. The dynamic memory management apparatus for HLS of claim 6, further comprising a request queuing module, which is in connection with the top searching and caching modules, wherein the request queuing module is for caching memory allocating requests and memory release requests issued by a computing unit, wherein the allocating requests that are failed due to out of memory are cached in a queue, and the dequeued allocating requests are added into the pipeline to participate in computing.

8. The dynamic memory management apparatus for HLS of claim 7, wherein the request queuing module is in connection with the individual searching and caching modules, respectively, plural searching and caching modules are arranged into a multi-layer structure that has as many layers as the search tree does, after one of the searching and caching modules analyzes the operators and the node data, the searching and caching module transmits the corresponding operators and the addresses of the nodes to be read to the next adjacent searching and caching module according to a predetermined order.

9. The dynamic memory management apparatus for HLS of claim 8, wherein the searching and caching module at the bottom layer and the modifying and writing-back module at the bottom layer are in connection with the switching module, after the searching and caching module at the bottom layer transmits the operators for releasing memory blocks to the switching module, the switching module transmits the operators to the modifying and writing-back module connected thereto and the order of the operators is reversed.

10. A dynamic memory management method for HLS, at least comprising:

arranging several searching and caching modules into a multi-layer structure that has as many layers as a search tree does, arranging several modifying and writing-back modules into a multi-layer structure that has as many layers as the search tree does, at the searching and caching modules, reading node data from a DRAM storing module according to operators and node address transmitted by the upper layer and writing the node data into a block random access memory (BRAM) buffer that caches information about nodes on the search path and caches modification made to the nodes; and at the modifying and writing-back modules, reading the node data from the BRAM buffer and writing the node data back into the DRAM storing module.

11. The dynamic memory management method for HLS of claim 10, the method further comprising:

dividing the DRAM storing module into at least a static storage area, a dynamic storage area, and a multi-way search tree storage area; wherein the static storage area is for storing information that will not be released once written, the dynamic storage area is a dynamically managed memory area; and the multi-way search tree storage area is for storing search tree structure information and is configured to manage memory in such a manner that:

it manages free memory blocks in the memory based on the search tree data structure; wherein a free memory block is a minimum unit of the memory.

12. The dynamic memory management method for HLS of claim 11, wherein the searching and caching modules are arranged into a multi-layer structure that has as many layers as the search tree does, wherein
after one of the searching and caching modules analyzes the operators and the node data, the searching and caching module transmits the corresponding operators and the addresses of the nodes to be read to the next adjacent searching and caching module.

13. The dynamic memory management method for HLS of claim 12, wherein the modifying and writing-back modules are arranged into a multi-layer structure that has as many layers as the search tree does, and
the modifying and writing-back modules modify the nodes in the BRAM buffer according to the received operators, and write the node data back into the multi-way search tree storage area in the DRAM storing module, wherein
after one of the modifying and writing-back modules analyzes the operators and the read nodes, the modifying and writing-back module transmits the corresponding operators to the modifying and writing-back module at the next layer.

14. The dynamic memory management method for HLS of claim 13, wherein a data transmission order among the layers of the searching and caching modules is reverse to a data transmission order among the layers of the plural modifying and writing-back modules.

15. The dynamic memory management method for HLS of claim 14, wherein the multi-way search tree storage area is for storing search tree structure information so that the search tree structure information is managed based on a free node linked list at node based granularity, wherein
for node extraction, the multi-way search tree storage area extracts the next node from a head of the free node linked list, and for node release, a free node is inserted back into the head of the free node linked list.

16. The dynamic memory management method for HLS of claim 15, wherein a switching module is in connection with the searching and caching module at the bottom layer and the modifying and writing-back module at the bottom layer, respectively, wherein
after the searching and caching module at the bottom layer transmits the operators for releasing the memory blocks to the switching module, the switching module reverses a transmission order of the operators and transmits the operators to the modifying and writing-back module connected thereto.

17. The dynamic memory management method for HLS of claim 16, wherein a request queuing module is in connection with the plural searching and caching modules, wherein
the request queuing module is for caching memory allocating requests and memory release requests issued by a computing unit, wherein
the allocating requests that are failed due to out of memory are cached in a queue, and
the dequeued allocating requests are added into a pipeline to compute.

18. The dynamic memory management method for HLS of claim 17, wherein
the request queuing module is in connection with the individual searching and caching modules, respectively,
plural searching and caching modules are arranged into a multi-layer structure that has as many layers as the search tree,
after one of the searching and caching modules analyzes the operators and the node data, the searching and caching module transmits the corresponding operator and the address of the node to be read to the next searching and caching module according to a predetermined order,
the operator and the node data are transmitted from the searching and caching module at the upper layer to the searching and caching module at the lower layer.

19. The dynamic memory management method for HLS of claim 18, wherein the searching and caching module and the modifying and writing-back module at the bottom layer are in connection with the switching module respectively,
after the searching and caching module at the bottom layer transmits the operators for releasing memory blocks to the switching module, the switching module reverses the transmission order and transmits to the modifying and writing-back module connected thereto.

* * * * *